UNITED STATES PATENT OFFICE.

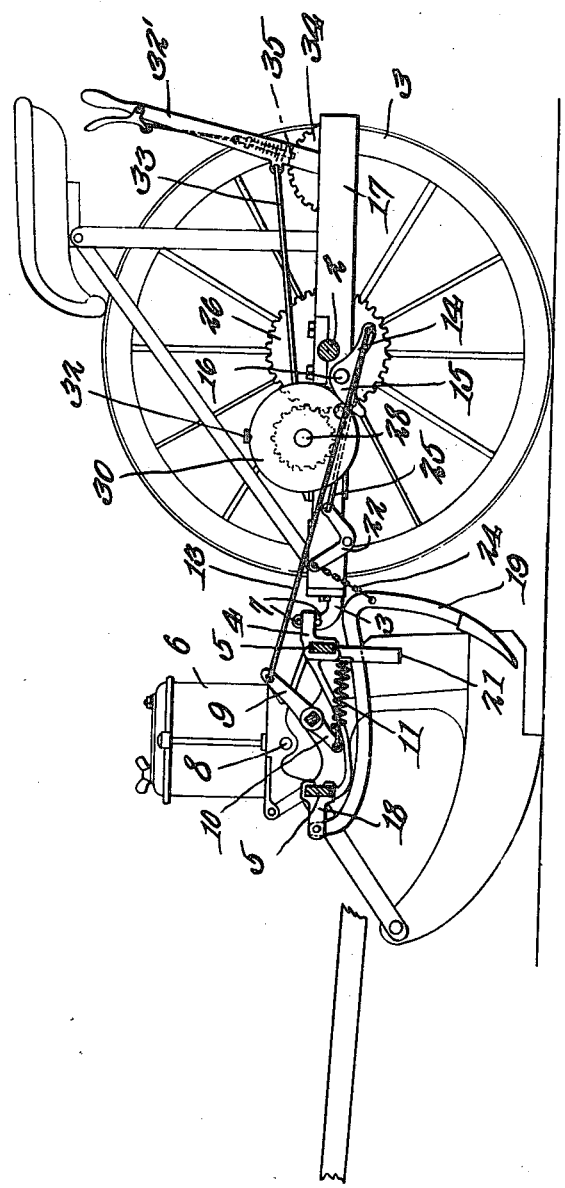

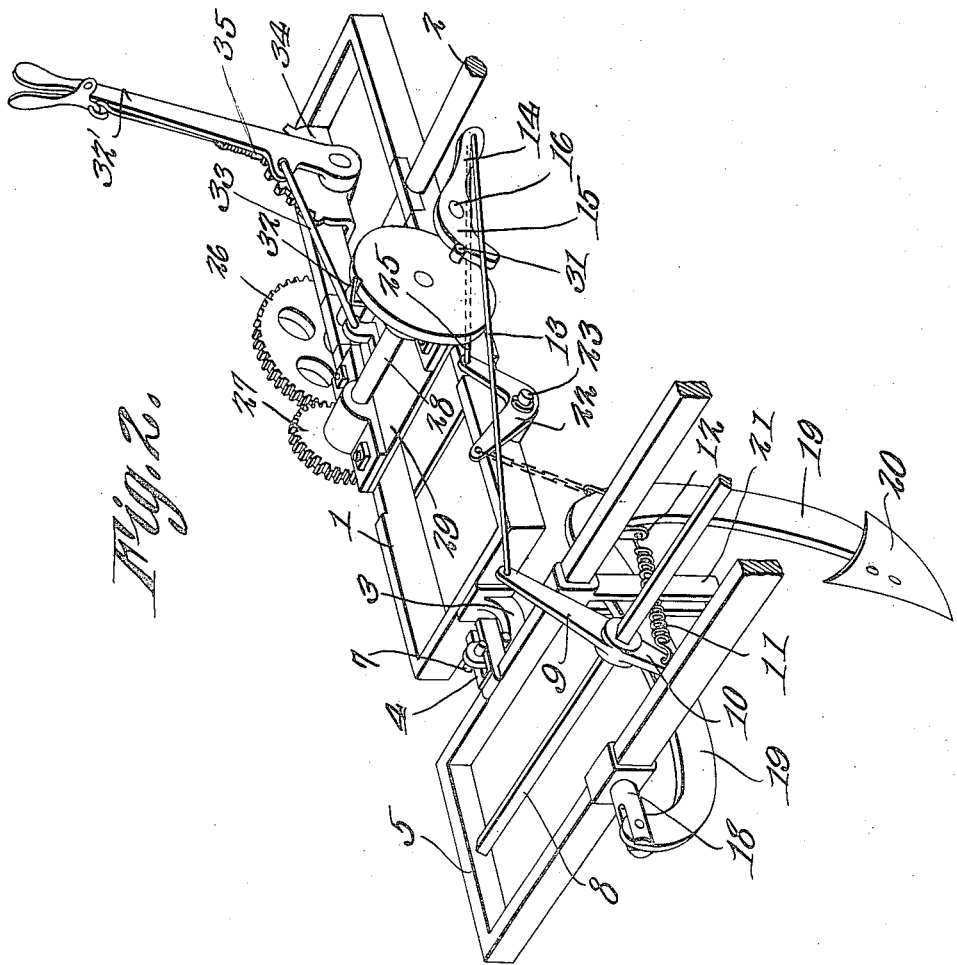

WILLIAM M. WILKEY, OF KINGMAN, INDIANA.

PLANTER.

1,265,566.

Specification of Letters Patent.   Patented May 7, 1918.

Application filed March 17, 1917. Serial No. 155,511.

*To all whom it may concern:*

Be it known that I, WILLIAM M. WILKEY, a citizen of the United States, residing at Kingman, in the county of Fountain and State of Indiana, have invented a new and useful Planter, of which the following is a specification.

This invention relates to planters and more particularly to a check row attachment whereby hills of seed may be planted at desired intervals without the necessity of utilizing a check wire.

A further object is to provide a novel form of marking device for use in connection with the dropper operating mechanism whereby it can be readily determined by the operator when the seeds are being planted in rows.

Another object is to provide means whereby the marking and dropping mechanism can be quickly thrown into or out of gear with its operating means.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Figure 1 is a vertical longitudinal section through a planter embodying the present improvements, certain of the parts being broken away.

Fig. 2 is a perspective view of the mechanism constituting the present invention.

Referring to the figures by characters of reference 1 designates a portion of the main frame of a planter, the same being supported by a revoluble axle 2 which is connected to and carried by supporting wheels one of which has been shown at 3. Extending forwardly from the frame 1 are tongues one of which has been indicated at 3, these tongues being extended through slotted brackets 4 extending rearwardly from a front frame 5 designed to carry the seed box 6. Pins 7 are extended through each tongue 3 above and below the bracket 4 so that the two frames can thus swing relative to each other.

A rock shaft 8 is journaled within the front frame 5 and is adapted to actuate dropping mechanism not shown. To this rock shaft are secured oppositely extending arms 9 and 10, the lower arm 10 being connected by a spring 11 to a bracket 12 depending from the rear portion of the frame 5. The upper arm 9 is connected by a rod 13 to the arm 14 of a tripping dog 15 which is pivotally mounted, as at 16, upon a beam 17 arranged longitudinally within the frame 1.

A bracket 18 is extended forwardly from the frame 5 and pivoted to this bracket is the rearwardly and downwardly extended beam 19 of a marking blade 20. This beam 19 is adapted to work upwardly and downwardly within a guide bracket 21 depending from the rear portion of the frame 5.

A bell crank lever 22 is pivotally mounted as at 23 upon the beam 17 and one arm of this lever is connected by a chain 24 or the like to the beam 19, while the other arm is connected by a rod 25 to the arm 14 of dog 15.

Secured to the axle 2 so as to rotate therewith is a drive gear 26 and this gear is adapted to mesh with a smaller gear 27 secured to a shaft 28 which is journaled on a slide 29. Said slide is adapted to reciprocate on the frame 1 and may be held thereto in any manner desired.

Secured to shaft 28 so as to rotate therewith is a disk 30 having a tappet 31 adapted, during the rotation of the disk, to engage and depress the dog 15. An index 32 laps the periphery of the disk and by means thereof the mechanism can be properly set at the beginning of a row so that the marking along the new row will coincide with that of the adjoining rows.

Obviously after the parts have been set and while gears 26 and 27 are in mesh, the machine, when driven forward will cause motion to be transmitted through the gears to the disk 30. Thus the tappet 31 will actuate the dog 15 and cause the arm 14 to intermittently pull and release the rods 25 and 13. The actuation of rod 25 will result in the elevation of the blade 20 out of contact with the ground, thus leaving a hill which is readily visible to the driver. Simultaneously with the formation of this hill, the rod 13 actuates the arm 9 and causes shaft 8 to rock with the result that seeds are dropped in line with the hill. As soon as the dog 15 is released, the blade 20 drops to the ground and resumes its scraping action along the surface of the ground until it is again elevated whereupon another hill will be left to indicate the location of the planted seeds.

By means of a lever 32' which is connected by a rod 33 to the slide 29, said slide can be shifted to move the gear 27 out of or back into mesh with the gear 26, thereby to control the transmission of power from the supporting wheel to the marking and dropping mechanisms. Lever 32' is provided with a toothed segment 34 and a spring pressed dog 35 whereby the parts can be held in any position to which they may be adjusted.

What is claimed is:—

In a planter, the combination with a dropper actuating shaft yieldingly held against movement, a pivoted marker beam extending under the shaft, and an arm upon the shaft, of a dog having an arm, a bell crank lever, rod connections between one arm of the lever and the arm of the dog, and between the arm on the dog and the arm on the shaft, a flexible connection between the bell crank lever and the marker beam, a drive gear, a slide, a shaft journaled on the slide, a tappet revoluble with the said shaft, a gear secured to said shaft, and means for shifting the slide to move the gear into and out of mesh with the drive gear.

In testimony that I claim the foregoing as my own, I have hereto affixed my signature in the presence of two witnesses.

WILLIAM M. WILKEY.

Witnesses:
ALBERT P. JONES,
JAMES A. COPELAND.